United States Patent
Zhao et al.

(10) Patent No.: US 10,985,681 B2
(45) Date of Patent: Apr. 20, 2021

(54) SELF ADJUSTING GENERATOR SPEED CONTROL

(71) Applicant: VOLVO CONSTRUCTION EQUIPMENT AB, Eskilstuna (SE)

(72) Inventors: Yaang Zhao, Mechanicsburg, PA (US); Andrew Hidish, Hagerstown, MD (US)

(73) Assignee: BLAW-KNOX CORPORATION, Orlando, FL (US)

( * ) Notice: Subject to any disclaimer, the term of this patent is extended or adjusted under 35 U.S.C. 154(b) by 385 days.

(21) Appl. No.: 14/913,025

(22) PCT Filed: Sep. 11, 2013

(86) PCT No.: PCT/US2013/059122
§ 371 (c)(1),
(2) Date: Feb. 19, 2016

(87) PCT Pub. No.: WO2015/038107
PCT Pub. Date: Mar. 19, 2015

(65) Prior Publication Data
US 2016/0204725 A1    Jul. 14, 2016

(51) Int. Cl.
*H02P 9/06* (2006.01)
*G05B 13/02* (2006.01)
*H02P 9/10* (2006.01)

(52) U.S. Cl.
CPC ............. *H02P 9/06* (2013.01); *G05B 13/02* (2013.01); *H02P 9/10* (2013.01)

(58) Field of Classification Search
CPC .............. H02P 9/10; H02P 9/06; G05B 13/02
See application file for complete search history.

(56) References Cited

U.S. PATENT DOCUMENTS

| 4,777,425 A | 10/1988 | MacFarlane |
| 4,914,361 A | 4/1990 | Tajima et al. |

(Continued)

FOREIGN PATENT DOCUMENTS

| EP | 0096073 B1 | 3/1987 |
| GB | 1399629 A | 7/1975 |

(Continued)

OTHER PUBLICATIONS

International Search Report (Feb. 10, 2014) for corresponding International App. PCT/US2013/059122.

(Continued)

*Primary Examiner* — Viet P Nguyen
(74) *Attorney, Agent, or Firm* — Venable LLP; Jeffri A. Kaminski

(57) ABSTRACT

The present invention relates to a generator control system that includes a generator, a variable displacement pump, a generator speed sensor, and a generator speed controller. The generator speed sensor generates a measurement output signal that corresponds to the speed of the generator. The generator speed controller generates a control signal that controls the displacement of the displacement pump to limit generator speed surging. The generator speed controller applying default commanded event control gain values to the control signal when a commanded change in the load or speed of the engine or generator occurs, applying uncommantled event control gain values to the control signal in the absence of a commanded change in load or speed of the engine or gen erator, and reducing the uncommanded event control gain values as needed until the magnitude of generator speed surging is less than a threshold value or until a minimum uncommanded event control gain value threshold is reached.

10 Claims, 5 Drawing Sheets

(56) References Cited

U.S. PATENT DOCUMENTS

| | | | |
|---|---|---|---|
| 4,947,734 A | 8/1990 | Fujita et al. | |
| 6,381,529 B1 | 4/2002 | Mistry | |
| 6,555,929 B1 | 4/2003 | Eaton et al. | |
| 7,944,186 B2 | 5/2011 | Jabaji et al. | |
| 2001/0020192 A1* | 9/2001 | Ito | G05B 13/024 700/37 |
| 2010/0264885 A1* | 10/2010 | Olsen | F16H 61/444 322/40 |
| 2010/0289460 A1 | 11/2010 | Otake | |
| 2011/0000722 A1 | 1/2011 | Kawashima | |

FOREIGN PATENT DOCUMENTS

| | | |
|---|---|---|
| GB | 2132389 A | 7/1984 |
| JP | 2004182031 A | 7/2004 |

OTHER PUBLICATIONS

Written Opinion (Feb. 10, 2014) for corresponding International App. PCT/US2013/059122.
Extended European search report dated Aug. 2, 2017 for corresponding EP application 13893614.1.

\* cited by examiner

SELF ADJUSTING GENERATOR SPEED CONTROL

FIELD OF THE INVENTION

The present invention relates to a self adjusting generator speed control and in particular to a self adjusting generator speed control with improved relative stability.

BACKGROUND OF THE INVENTION

Construction machinery, such as pavers, for example, is often times provided with an engine that drives a generator. In addition to the load from the generator, and any associated generator pumps, loads on the engine often times include variable displacement pumps for propulsion, actuation, and auger/conveyor operations. These loads can change suddenly and significantly when machine operation scenarios change (e.g., from standstill to forward motion, or vice versa). Significant and sudden changes in loads on the engine cause significant changes in engine speed. Since the engine is the ultimate driver of the generator, engine speed change also causes generator speed change. In fact, empirical observations have demonstrated that speed change in the engine is highly correlated with speed change in the generator. Additionally, significant load changes (e.g. heating the screed or turning on lights) on the generator can also cause speed changes in the generator, and speed change in the engine (to a less degree).

During operation, machines may experience what is commonly referred to as "generator speed surging." During speed surging, the generator speed fluctuates significantly but is not totally out of control. This problem generates a noticeable and unpleasant sound and may have other potential negative impacts. In control terminology this is recognized as a relative stability problem. Although nonlinear PID control algorithm with gain scheduling and open-loop terms are known, they are not able to detect or stop speed surging.

Although the speed surging problem has a root cause in hardware, control algorithm and gain tuning can have a significant impact on this problem. Part of the deficiency in the nonlinear PID control algorithm, as well as in control algorithms in the overwhelming majority of real word control applications in many industries, is that the control gains are constant and do not respond equally well to various operating scenarios or conditions. The gain scheduling feature in the nonlinear PID control algorithm, compared with commonly used single parameter constant gains, provides some level of adaptability to different operating scenarios or conditions, but is unfortunately insufficient to provide full adaptability for such a demanding application.

The present invention is directed at an improved self adjusting generator speed control and in particular to a self adjusting generator speed control with improved relative stability.

Aspects

According to one aspect of the present invention, a generator control system comprises:
 a generator
 a variable displacement pump that drives a motor;
 a motor that drives the generator;
 a generator speed sensor that monitors the speed of the generator and
 generates a measurement output signal that corresponds to the speed of the generator;
 a generator speed controller that receives the measurement output signal from the generator speed sensor and generates a control signal that controls the displacement of the variable displacement pump, wherein:
  the generator speed controller applies default commanded event control gain values to the control signal when a commanded change in the load or speed of the engine or generator occurs;
  the generator speed controller applies uncommanded event control gain values to the control signal in the absence of a commanded change in load or speed of the engine or generator; and
  the generator speed controller compares a magnitude of generator speed surging that results from applying the uncommanded event control gain values to a threshold value and reduces the uncommanded event control gain values as needed until the magnitude of generator speed surging is less than the threshold value or until a minimum uncommanded event control gain value threshold is reached.

According to preferred aspect of the present invention, each reduction to the uncommanded event control gain values involves reducing the previous iteration control gain value by 10% until the magnitude of generator speed surging is less than the threshold value or until a minimum uncommanded event control gain value threshold is reached.

According to preferred aspect of the present invention, the magnitude of generator speed surging is calculated as the average value of the absolute value of the difference between measured generator speed and a target generator speed over a time period.

According to preferred aspect of the present invention, the magnitude of generator speed surging is calculated as the average value of the absolute value of the difference between measured generator speed and a target generator speed over a time period substantially equal to two periods of a waveform representing generator speed fluctuation.

According to preferred aspect of the present invention, the threshold value is greater than or equal to about 6RPMs and less than or equal to about 9 RPMs.

According to another aspect of the present invention, a method for controlling speed surging in a generator driven by a variable displacement pump comprises the steps of:
 using a generator speed sensor to monitor the speed of the generator and generate a measurement output signal that corresponds to the speed of the generator;
 using a generator speed controller to receive the measurement output signal from the generator speed sensor and generate a control signal that controls the displacement of the variable displacement pump;
 using the generator speed controller to apply default commanded event control gain values to the control signal when a commanded change in the load or speed of the engine or generator occurs;
 using the generator speed controller to apply uncommanded event control gain values to the control signal in the absence of a commanded change in load or speed of the engine or generator; and
 using the generator speed controller to compare a magnitude of generator speed surging that results from applying the uncommanded event control gain values to the control signal to a threshold value and to reduce the uncommanded event control gain values as needed until a magnitude of generator speed surging is less than the threshold value or until a minimum uncommanded event control gain value threshold is reached.

According to preferred aspect of the present invention, each reduction to the uncommanded event control gain values involves reducing the previous uncommanded event control gain values by 10% until the magnitude of generator speed surging is less than the threshold value or until a minimum uncommanded event control gain value threshold is reached.

According to preferred aspect of the present invention, the magnitude of generator speed surging is calculated as the average value of the absolute value of the difference between measured generator speed and a target generator speed over a time period.

According to preferred aspect of the present invention, the magnitude of generator speed surging is calculated as the average value of the absolute value of the difference between measured generator speed and a target generator speed over a time period substantially equal to two periods of a waveform representing generator speed fluctuation.

According to preferred aspect of the present invention, the threshold value is greater than or equal to about 6 RPMs and less than or equal to about 9 RPMs.

SUMMARY OF THE INVENTION

According to one embodiment of the present invention a generator control system includes a generator, a variable displacement pump that drives a motor, a motor that drives the generator, a generator speed sensor that monitors the speed of the generator and generates a measurement output signal that corresponds to the speed of the generator, and a generator speed controller that receives the measurement output signal from the generator speed sensor and generates a control signal that controls the displacement of the variable displacement pump. The generator speed controller applies default commanded event control gain values to the control signal when a commanded change in the load or speed of the engine or generator occurs, applies uncommanded event control gain values to the control signal in the absence of a commanded change in load or speed of the engine or generator, and compares a magnitude of generator speed surging that results from applying the uncommanded event control gain values to a threshold value and reduces the uncommanded event control gain values as needed until the magnitude of generator speed surging is less than the threshold value or until a minimum uncommanded event control gain value threshold is reached.

According to another embodiment of the present invention, a method for controlling speed surging in a generator driven by a variable displacement pump includes the steps of using a generator speed sensor to monitor the speed of the generator and generate a measurement output signal that corresponds to the speed of the generator, using a generator speed controller to receive the measurement output signal from the generator speed sensor and generate a control signal that controls the displacement of the variable displacement pump, using the generator speed controller to apply default commanded event control gain values to the control signal when a commanded change in the load or speed of the engine or generator occurs, using the generator speed controller to apply uncommanded event control gain values to the control signal in the absence of a commanded change in load or speed of the engine or generator, and using the generator speed controller to compare a magnitude of generator speed surging that results from applying the uncommanded event control gain values to the control signal to a threshold value and to reduce the uncommanded event control gain values as needed until a magnitude of generator speed surging is less than the threshold value or until a minimum uncommanded event control gain value threshold is reached.

DETAILED DESCRIPTON OF THE INVENTION

Figure 1:
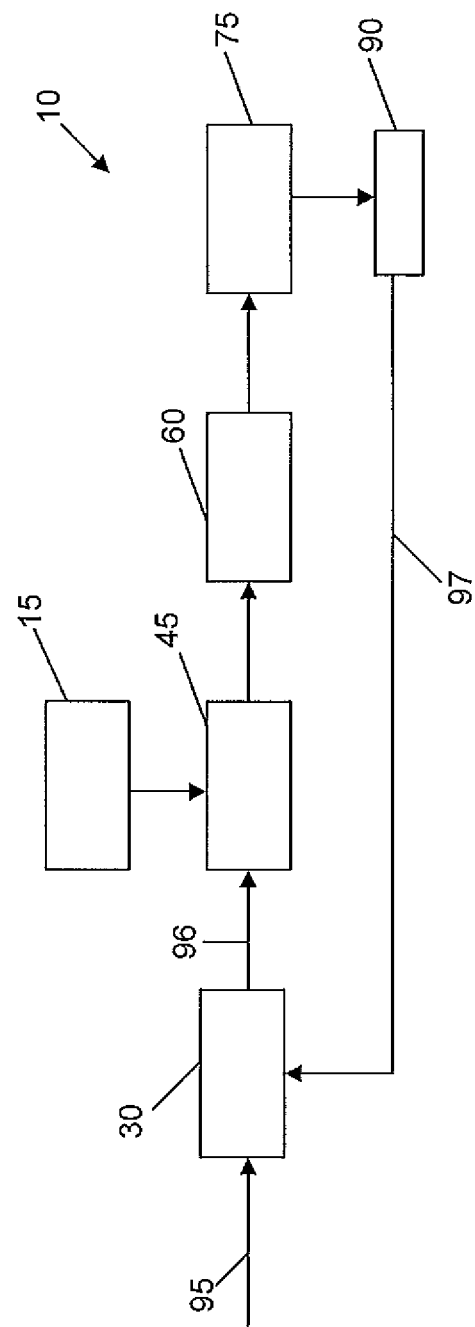
FIG. 1 depicts a schematic of a generator speed control system according to one embodiment.

FIG. 1 depicts a generator control speed control system 10 according to one embodiment of the present invention. As shown therein the generator speed control system 10 includes an engine 15, a generator speed controller 30, a variable displacement pump 45, a fixed displacement motor 60, a generator 75, and a generator speed sensor 90.

As shown, the engine 15, which may be a diesel engine, drives the variable displacement pump 45. The displacement pump 45 is preferably hydraulic and controlled via electric displacement control, such as via a pulse width modulation signal generated by the generator speed controller 30. Also shown, the variable displacement pump 45 drives the generator 75 indirectly, by driving a fixed displacement motor 60, which in turn drives the generator 75. As FIG. 1 illustrates, the generator speed sensor 90 monitors the speed of the generator and generates a measurement output signal 97 corresponding to speed of the generator 90, which is supplied to the generator speed controller 30. Those of ordinary skill in the art will appreciate that the engine 15 generates mechanical power used to drive other components (not shown) that apply loads to the engine and generator 75 generates electrical power used to drive other components (not shown) that apply loads to the generator 75.

According to one aspect of the present embodiment the generator speed controller 30 is adapted to receive a target generator speed signal 95. According to another aspect of the present embodiment, the generator speed controller 30 is adapted to output a control signal 96, preferably a pulse width modulation signal, to the displacement pump 45. According to yet another aspect of the present embodiment, the control signal 96 is adapted to control the operation of the displacement pump 45 so that the generator 90 operates at a speed that corresponds to the speed commanded by the target generator speed signal 95.

According to another aspect of the present embodiment, the generator speed controller 30 is adapted to control speed surging in the generator 75. Advantageously, the generator speed controller 30 compares the target generator speed signal 95 to the measurement output signal 97 generated by the generator speed sensor 90 and applies speed control gain values to generate a control signal 96 adapted to reduce the magnitude of speed surging in the generator 75.

Figure 2:
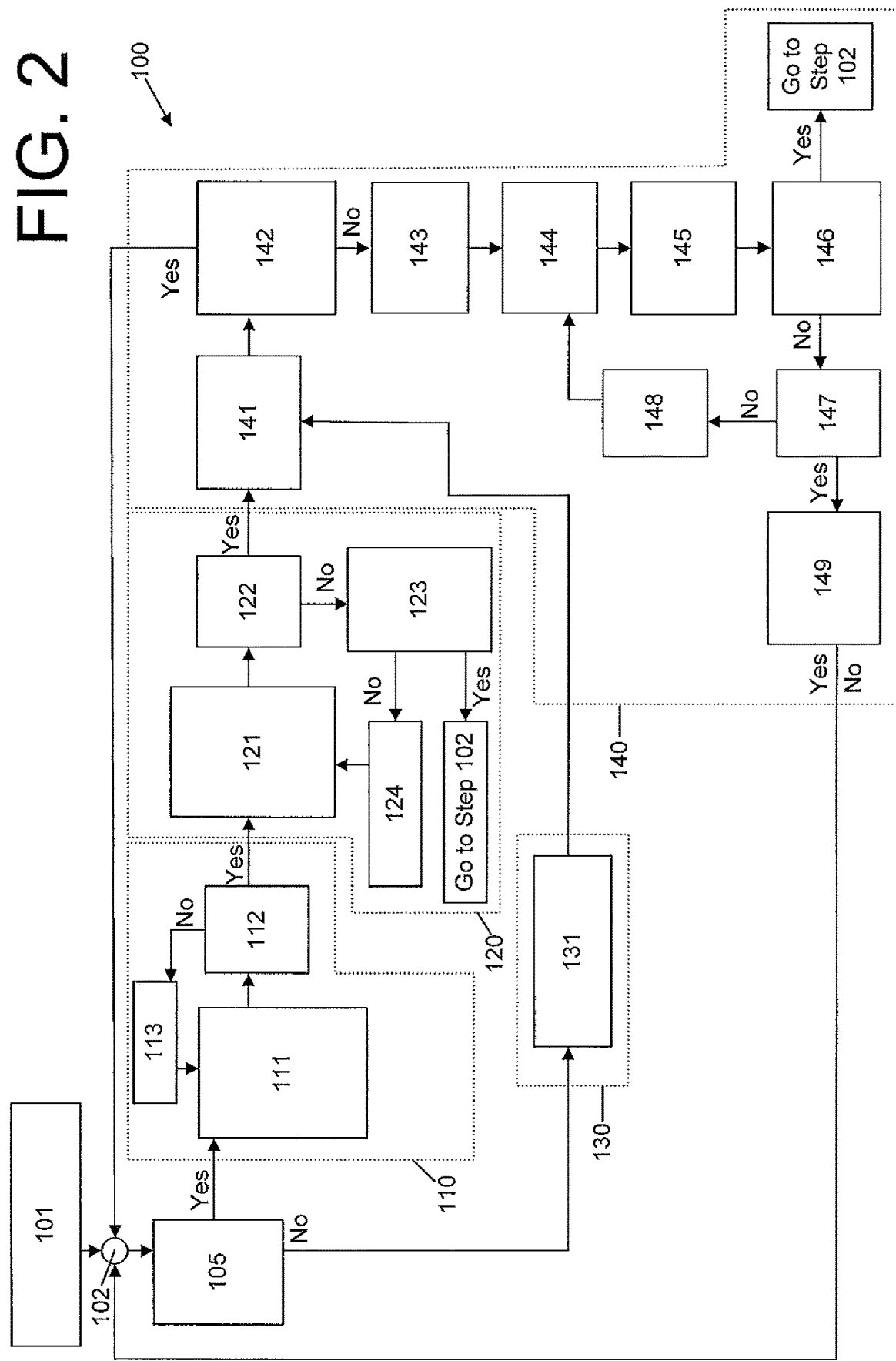
FIG. 2 depicts a process for controlling generator speed according to one embodiment.

FIG. 2 illustrates a process 100 carried out by the generator speed controller 30 of one embodiment for controlling the speed of the generator 75. As shown, the generator speed controller 30 is adapted to control the speed of the generator 75 via execution of a first process module 110, a second process module 120, a third process module 130, and a fourth process module 140. The process module 110 accesses commanded event control gain values and the process modules 120, 130, and 140 access uncommanded event control gain values for purposes of controlling speed surging. According to one aspect of the present embodiment, the uncommanded event control gain values are less than the commanded event control gain values.

In the initializing step 101, the uncommanded event control gain values are equal to the commanded event control gain values, which are constants that were already (previously and separately) obtained from tuning control gains for commanded load (or engine target speed) changing scenarios. After the first time through the process 100, step 102 provides the starting point for repetitive software execution and the uncommanded event control gain values applied in step 121 will typically be equal to the values from step 142 or 149 from the last iteration, as described hereinafter.

Each time the process 100 is repeated, the process commences with step 105, where it is determined whether or not a commanded change in the load on or speed of the engine 15 or load of the generator 75 has occurred. The command in change in the load on or speed of the engine 15 or load of generator 75 may be manually commanded, by an operator, or by components (not shown) that apply loads to the engine 15 or the generator 75 or change the speed of the engine 15 or the generator 75. If the answer to step 105 is in the negative, then the process 100 proceeds to the third process module 130, whereat in step 131 uncommanded event control gain values stored in the memory are applied to generate the output signal 97 of the generator speed controller 130. Thereafter, the third process module 130 proceeds directly to the fourth process module 140 and step 141.

If the answer to step 105 is in the affirmative, the process proceeds to the first process module 110, whereat step 111 is commenced and default commanded event control gain values are applied to generate the output signal 97 of the generator speed controller 130. The commanded event control gain values are applied for a first time period, which is initialized in step 111. According to one aspect of the present embodiment, the default commanded event control gain values are selected to prioritize adequate transition performance during periods of commanded fluctuations in load or speed on the engine 15 or generator 75 over generator speed surging. According to another aspect of the present embodiment, the default commanded event control gain values are greater than uncommanded event control gain values that result from execution of module 140. Since transitionary operating conditions, which lead to using larger control gain values, are transitory, the first time period may be of a small duration, such as, for example, and not limitation, about 2 seconds.

Upon completion of step 111, the process proceeds to step 112, whereat it is determined whether or not the first time period has expired. If the answer to step 112 is no, the first time period is incremented in step 113 and time looped in step 111, until step 112 is answered in the affirmative.

When step 112 is answered in the affirmative, the process 100 proceeds to the second process module 120, whereat step 121 is commenced and uncommanded event control gain values stored in the memory are applied to generate the output signal 97 of the generator speed controller. The uncommanded event control gain values are applied for a second time period, which is initialized in step 121. According to one aspect of the present embodiment, the second time period is adapted to allow the uncommanded event control gain values to cause the generator speed to transition from a relatively higher magnitude of speed fluctuation to a relatively lower magnitude of speed fluctuation prior to the expiration of the second time period. According to another aspect of the present embodiment, the second time period is adapted to allow a waveform representing uncommanded generator speed fluctuations to settle into a substantially repeatable pattern. The second time period may, for example, and not limitation, be about 8 seconds.

Upon completion of step 121, the process proceeds to step 122, whereat it is determined whether or not the second time period has expired. If the answer to step 122 is no, in step 123 it is determined whether or not another commanded change in the load or speed in the engine 15 or generator 75 has occurred after the expiration of the first time period. If the answer to step 123 is in the affirmative, the second process module 120 prematurely exits prior to the expiration of the second time period, whereupon the process 100 returns to step 102. If the answer to step 123 is in the negative, the second time period is incremented in step 124, time looped in step 121, and steps 121-124 are repeated until either step 122 is answered in the affirmative, whereat the process 100 proceeds to the fourth process module 140 or step 123 is answered in the affirmative and the first process module 110 is reinstituted.

In step 141 of the fourth process module 140, the magnitude of speed surging is determined According to one aspect of the present embodiment, the magnitude of speed surging may be quantified by the amplitude of speed fluctuation. By way of example, where generator speed fluctuates between 1700 RPM and 1900 RPM, with an average value of 1800, the magnitude of the surge may be quantified as (+/−) 100 RPM.

Advantageously, the surge magnitude can be determined in real-time in a mathematical way. By way of example, the amplitude of speed fluctuation can be calculated as the average value of the absolute value of the generator speed error, i.e. the difference between measured generator speed and the target generator speed, over a time period substantially equal to two periods of a waveform representing the generator speed fluctuation, which may for example be 1.4 seconds.

After step 141, the surge magnitude is compared to a predetermined threshold value to determine whether the surge magnitude is less than the threshold value in step 142. The particular threshold value at which speed surging generates negative impacts, including unpleasant sounds will vary from machine to machine and may be established by empirical observation, including, but not limited to, specific on-machine testing prior to implementation of the process 100. By way of example, in one test, noticeable undesirable noise generated due to generator speed fluctuations disappeared when the magnitude of speed fluctuation was controlled to be less than about (+/−) 6 RPM to (+/−) 9 RPM. Accordingly, the threshold value may, for example, and not limitation, be about 9 RPM.

If the answer to step 142 is in the affirmative, the uncommanded event control gain values applied in step 131 or 121 may be stored in memory and the process 100 repeats itself starting proceeds with step 105. If the answer to step 142 is in the negative, and the surge magnitude is greater than the threshold value, the process proceeds to step 143, whereat the uncommanded event control gain values are reduced and applied.

After a reduction to the uncommanded event control gain values in step 143, the process 100 proceeds to step 144, whereat a third time period is initialized. The third timer period is adapted so that the reduced control gain values applied in step 143 have enough time to effect change in the magnitude of speed surging before re-comparison of the magnitude of speed surging with the threshold value. Upon completion of step 144, in step 145 the magnitude of generator speed surging is again determined Upon completion of step 145, the process proceeds to step 146, whereat it is determined whether or not another commanded change in the load or speed in the engine 15 or generator 75 has occurred after the expiration of the third time period. If the answer to step 146 is in the affirmative, the fourth process module 120 prematurely exits prior to the expiration of the third time period, whereupon the process 100 returns to step 102.

If the answer to step 146 is in the negative, the process proceeds to step 147 whereat it is determined whether or not the third time period has expired. If the answer to step 147 is no, the third time period is incremented in step 148, time looped in step 144, and steps 144-148 are repeated, until step 147 is answered in the affirmative.

If step 147 is answered in the affirmative, the process proceeds to step 149, whereat the magnitude of the uncommanded event control gain values are compared with pre-defined minimum threshold values for the uncommanded event control gain values. According to one aspect of the present embodiment, the pre-defined minimum threshold values are selected to provide a minimum level of control system performance. The pre-defined minimum threshold values may be established via empirical observation. If the answer to step 149 is affirmative, then the minimum threshold values, which are stored in memory, are assigned as the uncommanded event control gain values and the logic flows back to step 102; if the answer to step 149 is negative, then the uncommanded event control gain values obtained from step 145 are applied, and the logic also flows back to step 102, from which the processes start all over again by moving to step 105 from step 102.

Figure 3:
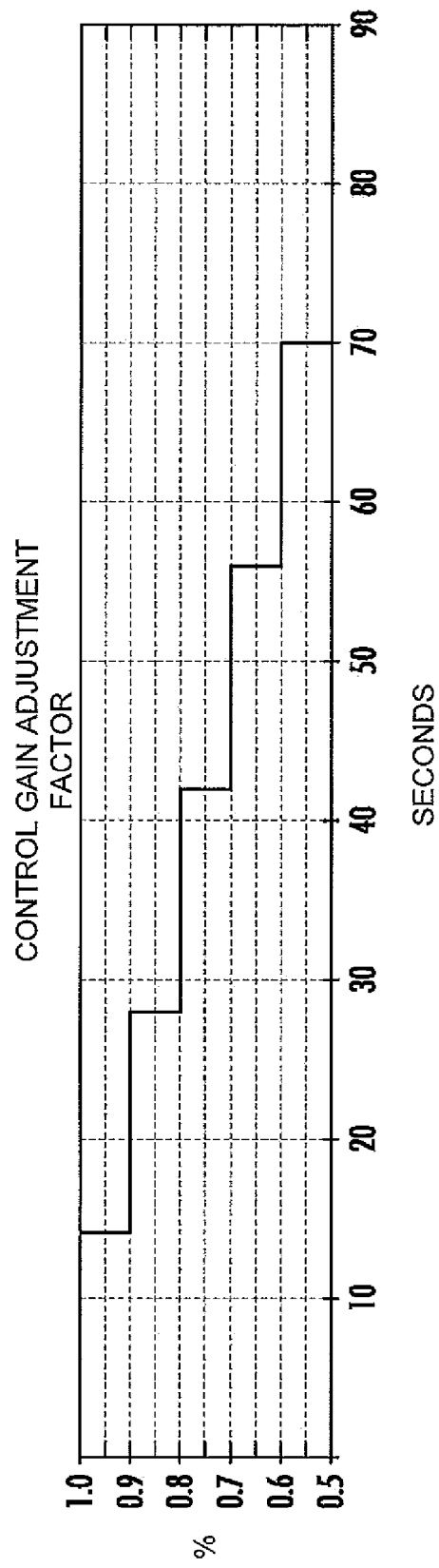
FIG. 3 depicts a graphical illustration of a stepwise reduction of default uncommanded event control gain values in one embodiment.
Figure 4:
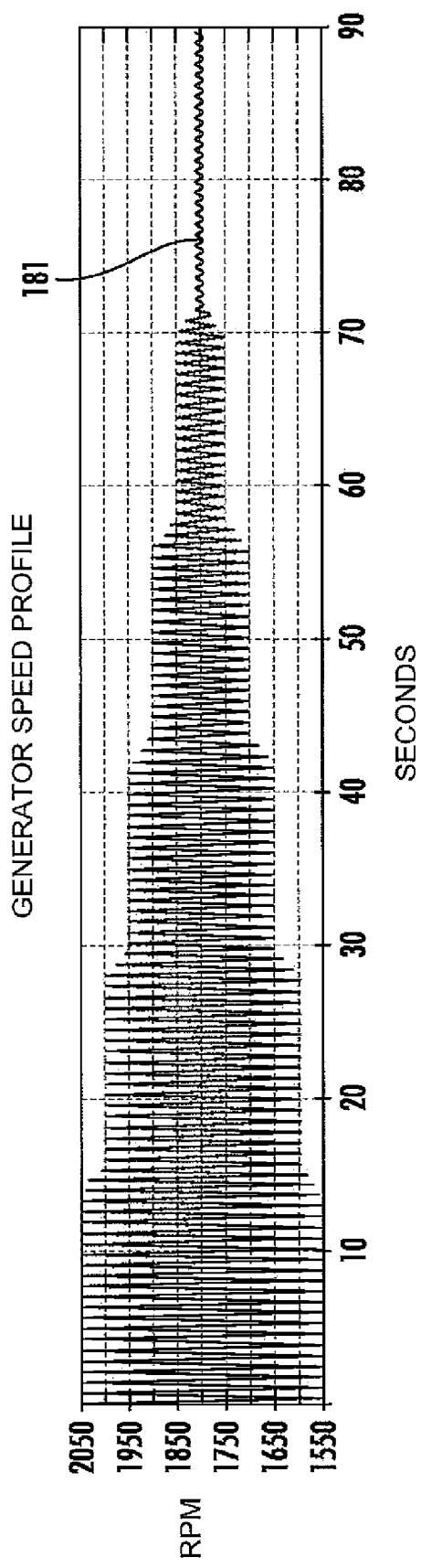
FIG. 4 depicts a graphical illustration of a generator speed profile that results from the stepwise reduction of default uncommanded event control gain values shown in FIG. 3.
Figure 5:
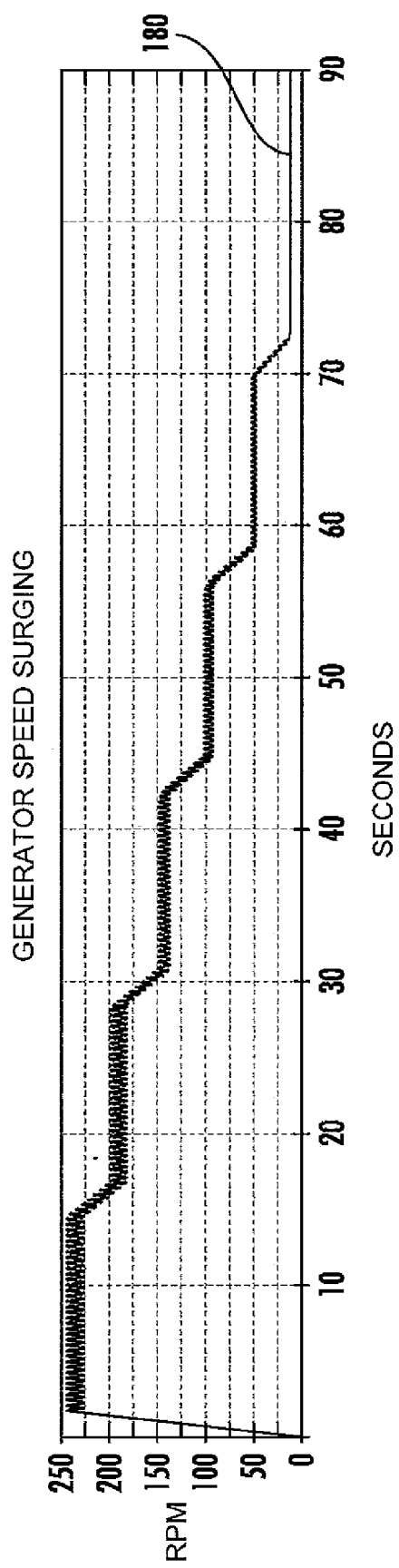
FIG. 5 depicts a graphical illustration of the magnitude of generator speed surging that results from the stepwise reduction of default uncommanded event control gain values shown in FIG. 3.

As shown in FIG. 3, in this manner, by way of example, and not limitation, the uncommanded event control gain values may be reduced in a stepwise manner until, as shown in FIG. 5, generator speed surging, e.g. the average value of the absolute value of the generator speed error over a time period of 1.4 seconds, is less than a threshold value of 9 RPM as at 180. As shown in FIG. 4, by applying the uncommanded event control gain values of FIG. 3, the resultant generator speed fluctuation are minimized as at 181 to an acceptable level that wherein generator speed surging does not occur.

In one specific implementation, the initial values of the uncommanded event control gain values may be set to be equal to a default value which are constants. Each reduction to the uncommanded event control gain values may then be a fixed percentage reduction in the previous time-step uncommanded event control gain values. By way of example, in any subsequent iterations in which the uncommanded event control gain values are adjusted, the adjustment may be a reduction of 10% of the previous values from the previous iteration. For example, if the initial values are at 100% (of default values), then the first adjustment results in gain values at 90%, the second adjustment results in gain values at 81% (of default values, 81% being 90% multiplied by 90%), the third adjustment results in gain values at 72.9% of the default values, and so forth, until the resultant uncommanded event control gain values produce a generator speed fluctuation that is less than the threshold value or the resultant uncommanded event control gain values are less than the predetermined minimum threshold value, as discussed in relation to step 149.

The default gain values are used as initial values in the first iteration of the software program execution. The default gain values may also be used whenever a transient event is detected in module 105. Under all the other conditions that are mutually exclusive to the above two conditions, the non-default uncommanded control gain values are used where the default values fail to provide a generator speed surge magnitude that is less than the pre-determined threshold value.

Those of ordinary skill in the art will appreciate that the aspects of the present invention may be embodied in computer program product comprising computer usable medium including executable code executing a control algorithm carried out by the generator speed controller 30, so that the generator speed controller 30 compares a magnitude of generator speed surging that result from applying uncommanded event control gain values to the control signal 96 with the threshold value and reduces the uncommanded event control gain values as needed until the magnitude of generator speed surging is less than the threshold value. Accordingly, the invention is defined solely by the appended claims and not limited to the specific process 100, which may be carried out in a preferred embodiment of the present invention.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. By way of example, and not limitation, although the generator speed controller 30 is illustrated schematically as a single component, however, within the scope of the present embodiment it may comprise one or a plurality of electronic devices. By way of example, and not limitation, the generator speed controller 30 may include one electronic device that compares the target generator speed signal 95 to the measurement output signal 97 generated by the generator speed sensor 90 and provides a speed error signal to a controller that uses the speed error to output the appropriate control signal 96. Additionally, by way of example, and not limitation, although the present embodiment was described in the context of a fixed step wise 90% reductions to the uncommanded event control gain values, within the scope of the present embodiment, the reductions may be a fixed percentage other than 90%, variable percentages, and percentages that vary according to the extent the surge magnitude exceeds the threshold value in step 141.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

We claim:

1. A generator control system comprising:
a generator;
a variable displacement pump that drives a motor;
the motor that drives the generator;
a generator speed sensor that monitors the speed of the generator and generates a measurement output signal that corresponds to the speed of the generator;
a generator speed controller that receives the measurement output signal from the generator speed sensor and generates a control signal that controls the displacement of the variable displacement pump, wherein:
the generator speed controller repeatedly determines whether or not a commanded change in the load on the engine, a commanded change in the speed of the engine, or a commanded change in the load of the generator has occurred and applies default commanded event control gain values to the control signal upon an affirmative determination of an occurrence of the commanded change in the load on the engine, the commanded change in the speed of the engine, or the commanded change in the load of the generator and applies uncommanded event control gain values to the control signal upon a negative determination of an occurrence of the commanded change in the load on the engine, the commanded change in the speed of the engine, and the commanded change in the load of the generator; and
the generator speed controller compares a magnitude of generator speed surging that results from applying the uncommanded event control gain values to a threshold value and reduces the uncommanded event control gain values as needed until either the magnitude of generator speed surging is less than the threshold value or until a minimum uncommanded event control gain value threshold is reached, whichever comes first.

2. The control system according to claim 1, wherein each reduction to the uncommanded event control gain values involves reducing the previous iteration control gain value by 10% until the magnitude of generator speed surging is less than the threshold value or until a minimum uncommanded event control gain value threshold is reached.

3. The control system according to claim 1, wherein the magnitude of generator speed surging is calculated as the average value of the absolute value of the difference between measured generator speed and a target generator speed over a time period.

4. The control system according to claim 1, wherein the magnitude of generator speed surging is calculated as the average value of the absolute value of the difference between measured generator speed and a target generator speed over a time period substantially equal to two periods of a waveform representing generator speed fluctuation.

5. The control system according to claim 1, wherein the threshold value is greater than or equal to about 6 RPMs and less than or equal to about 9 RPMs.

6. A method for controlling speed surging in a generator driven by a variable displacement pump, comprising the steps of:
using a generator speed sensor to monitor the speed of the generator and generate a measurement output signal that corresponds to the speed of the generator;
using a generator speed controller to receive the measurement output signal from the generator speed sensor and generate a control signal that controls the displacement of the variable displacement pump;
using the generator speed controller to repeatedly determine whether or not a commanded change in the load on the engine, a commanded change in the speed of the engine, or a commanded change in the load of the generator has occurred and apply default commanded event control gain values to the control signal upon an affirmative determination of an occurrence of the commanded change in the load on the engine, the commanded change in the speed of the engine, or the commanded change in the load of the generator and apply uncommanded event control gain values to the control signal upon a negative determination of an occurrence of the commanded change in the load on the engine, the commanded change in the speed of the engine, and the commanded change in the load of the generator; and
using the generator speed controller to compare a magnitude of generator speed surging that results from applying the uncommanded event control gain values to the control signal to a threshold value and to reduce the uncommanded event control gain values as needed until either a magnitude of generator speed surging is less than the threshold value or until a minimum uncommanded event control gain value threshold is reached, whichever comes first.

7. The method for controlling speed surging in a generator according to claim 6, wherein each reduction to the uncommanded event control gain values involves reducing the previous uncommanded event control gain values by 10% until the magnitude of generator speed surging is less than the threshold value or until a minimum uncommanded event control gain value threshold is reached.

8. The method for controlling speed surging in a generator according to claim 6, wherein the magnitude of generator speed surging is calculated as the average value of the absolute value of the difference between measured generator speed and a target generator speed over a time period.

9. The method for controlling speed surging in a generator according to claim 6, wherein the magnitude of generator speed surging is calculated as the average value of the absolute value of the difference between measured generator speed and a target generator speed over a time period substantially equal to two periods of a waveform representing generator speed fluctuation.

10. The method for controlling speed surging in a generator according to claim 6, wherein the threshold value is greater than or equal to about 6 RPMs and less than or equal to about 9 RPMs.

* * * * *